United States Patent [19]

Bier et al.

[11] 4,207,230
[45] Jun. 10, 1980

[54] BLOCK COPOLYESTERS WHICH CRYSTALLIZE RAPIDLY

[75] Inventors: Peter Bier; Rudolf Binsack, both of Krefeld, Fed. Rep. of Germany

[73] Assignee: Bayer Aktiengesellschaft, Leverkusen, Fed. Rep. of Germany

[21] Appl. No.: 875,047

[22] Filed: Feb. 3, 1978

[30] Foreign Application Priority Data

Feb. 1, 1977 [DE] Fed. Rep. of Germany ....... 2706124

[51] Int. Cl.$^2$ .................... C08L 67/02; C08L 71/02
[52] U.S. Cl. .................... 260/45.95 R; 260/22 CR; 260/22 CB; 260/42.18; 260/45.7 P; 260/45.75 B; 260/45.75 C; 260/45.9 R; 260/45.9 P; 525/173; 525/176; 525/177; 525/408; 525/437
[58] Field of Search ............ 260/860, 45.95; 525/173, 177, 408

[56] References Cited

U.S. PATENT DOCUMENTS

| | | | |
|---|---|---|---|
| 2,744,087 | 5/1956 | Snyder | 260/75 |
| 3,692,744 | 9/1972 | Rich et al. | 260/75 T |
| 3,719,729 | 3/1973 | Le Paranthoen et al. | 260/87.3 |
| 3,843,752 | 10/1976 | Katayama et al. | |
| 3,849,515 | 11/1974 | Mueller | 260/860 |
| 4,069,278 | 1/1978 | Borman | 260/860 |
| 4,086,212 | 4/1978 | Bier et al. | |
| 4,107,149 | 8/1978 | Bier et al. | |

FOREIGN PATENT DOCUMENTS 2545720  4/1977  Fed. Rep. of Germany.

*Primary Examiner*—Carman J. Seccuro
*Attorney, Agent, or Firm*—Gene Harsh; Lawrence S. Pope

[57] ABSTRACT

The current invention is concerned with block copolyesters of low glass transition temperature segments and ethylene glycol based polyester segments linked together by carboxylic acid ester groups and special diols, and a process for preparing these copolyesters. These copolyesters display molded resin properties similar to polyethylene terephthalate but crystallization behavior similar to polybutylene terephthalate, i.e. they have high strength and superior solvent resistance, but they also crystallize rapidly. They are made by subjecting low glass transition temperature (less than 0° C.) polymers with carboxyl, hydroxyl or reactive ester end groups to esterification or transesterification conditions with ethylene glycol based polyester segments having a minimum intrinsic viscosity of 0.2 dl/g and special diols having four to ten carbon atoms with 3 or 4 carbon atoms between the hydroxyl groups in the presence of appropriate catalysts. In a preferred embodiment, the three components are subject to melt homogenization in an extruder and the solidified extrudate is subject to a solid state polycondensation reaction.

19 Claims, No Drawings

BLOCK COPOLYESTERS WHICH CRYSTALLIZE RAPIDLY

FIELD OF THE INVENTION

This invention relates to thermoplastic block copolyesters which crystallize rapidly.

BACKGROUND OF THE INVENTION

German Published Pat. (Offenlegungsschrift) No. 2,545,720 relates to highly crystalline thermoplastic block copolyesters which crystallize rapidly and have an intrinsic viscosity of at least 0.4 dl/g and which consist of A. 60-95% by weight, relative to the sum of A and B, of copolyester segments based on terephthalic acid radicals, ethylene glycol radicals and co-diol radicals and B. 40-5% by weight, relative to the sum of A and B, of block segments, linked to A, with a glass transition temperature below 0° C. and an average molecular weight of 400 to 1,000,000, A and B being linked to one another via carboxylate groups, characterized in that A consists of (a) at least 90 mol %, relative to the acid component, of terephthalic acid radicals, (b) 90-99.5 mol %, relative to the sum (b)+(c), of ethylene glycol radicals and (c) 10-0.5 mol %, relative to the sum (b)+(c), of radicals of co-diols with 4-10 C atoms, the OH groups of which are separated by aliphatic branched or unbranched alkylene groups with 3 or 4 C atoms and which either 1. carry at least one secondary or terteriary OH group or
2. carry two primary OH groups and are unsubstituted, monoalkyl-substituted or dialkyl-substituted, the sum of the C atoms of the substituents in the case of substitution being at least 4.

These copolyesters can be prepared in a manner which is in itself known by esterifying or transesterifying the dicarboxylic acids, preferably pure terephthalic acid, and/or the corresponding dimethyl esters with 1.05 to 4.0, preferably 1.8-3.6, mols of the diols, relative to 1 mol of the dicarboxylic acid component, with the addition of the polymer which is to be incorporated chemically as the block segment, in the presence of esterification and/or transesterification catalysts at between 150° and 250° C. (reaction step I) and subjecting the reaction products thus obtained to a polycondensation reaction under customary conditions, that is to say in the presence of esterification catalysts at between 200° and 300° C. under reduced pressure (<1 mm Hg) (reaction step II).

A particularly preferred embodiment consists in admixing the co-diols, together with the block segment polymers, to the reaction mixture as late as possible, that is to say only after the reaction of terephthalic acid, or of its ester-forming derivatives, with ethylene glycol to give bis-(2-hydroxyethyl) terephthalate has taken place or, even more advantageously, only after a polyethylene terephthalate prepolymer which has a degree of polycondensation of more than 4 has formed. Thereafter, the mixture can then be subjected to a polycondensation reaction in the customary manner, as described above.

SUMMARY OF THE INVENTION

It has now been found, surprisingly, that particularly good crystallization characteristics of the end product can be achieved when a polyethylene terephthalate which is free from co-diol and has an intrinsic viscosity of at least 0.2 dl/g (measured as a 0.5% strength by weight solution in a phenol/tetrachloroethane mixture [weight ratio 1:1] at 25° C.) is first prepared, this is homogenized in the melt with the co-diol and the block segment polymers and the solidified melt is then subjected to a solid phase after-condensation reaction.

The present invention thus relates to a process for the preparation of highly crystalline thermoplastic block copolyesters which crystallize rapidly and have an intrinsic viscosity of at least 0.4 dl/g comprising melt homogenizing the following reactants, solidifying the melt and subjecting the product to a solid state condensation:

A. about 60 to 95 wt. % based on the combined weight of A and B of a homopolyethylene terephthalate with a minimum intrinsic viscosity of 0.2 dl/g (in 1:1 phenol/tetrachloroethane at 25° C. and 0.5% strength), B. about 40 to 5 wt. % based on the combined weight of A and B of a polymer having:
1. a glass transition temperature less than about 0° C.,
2. reactive carboxyl, ester or hydroxyl end groups, and
3. an average molecular weight of about 400 to 1,000,000, and C. about 10 to 0.05 mol %, based on the mols of ethylene glycol residues in A, of a codiol having:
1. 4 to 10 carbon atoms,
2. 2 hydroxyl groups separated by aliphatic branched or unbranched radicals of 3 or 4 carbon atoms wherein
(a) at least one of said hydroxyl groups is secondary or tertiary, or
(b) said diol carrying two primary hydroxyl groups is:
(i) unsubstituted,
(ii) monoalkyl substituted, or
(iii) dialkyl substituted, and
said substituents, if any, have a total of at least 4 carbon atoms.

The present invention also relates to rapidly crystallizing thermoplastic block copolyesters obtainable by this process. These copolyesters consist essentially of the following structural units

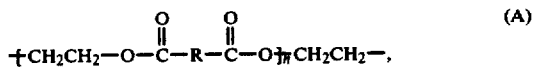

in each case said structural units being bound into the copolyester chain via

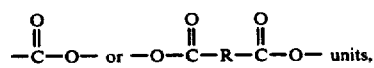

wherein

R is the carboxyl free residue of an aromatic, cycloaliphatic or aliphatic dicarboxylic acid and at least about 90 mol % of R is the residue of terephthalic acid, n is a polymerization degree sufficiently high to give the defined ethylene glycol based polyester segment an intrinsic viscosity of at least about 0.2 dl/g (in 1:1 phenol/tetrachloroethane at 25° C. and 0.5% strength), P is the reactive end group free residue of a polymer having a glass transition temperature below about 0° C., reactive carboxyl, ester or hydroxyl groups and an average molecular weight of about 400 to 1,000,000, and D is the hydroxyl free residue of a codiol having 4 to 10 carbon atoms with the hydroxyl groups separated by 3 or 4 carbon atom branched or unbranched aliphatic residues and at least one of the hydroxyl groups secondary or tertiary or the diol carrying two primary hydroxyl units is unsubstituted, monoalkyl substituted or dialkyl substituted and the substituents, if any, contain a total of at least 4 carbon atoms.

There is about 60 to 95 wt. % of structural units (A) and 40 to 5 wt. % of structural units (B) based on the total weight of units (A) and (B) and about 10 to 0.5 mol % of units (C) based on the mols of ethylene glycol residues in the units (A).

The polymers may be prepared and the process practiced by subjecting the necessary reactants to sufficient temperatures, preferably between about 150° and 250° C. in the presence of effective amounts of esterification or transesterification catalysts to cause condensation and subsequently subjecting the product in solid form to sufficient temperatures, preferably between about 200° and 300° C., under either reduced pressure or streaming nitrogen to cause solid state polycondensation.

Throughout this disclosure, the intrinsic viscosity is measured at 25° C. as a 0.5% strength by weight solution in a phenol/tetrachloroethane mixture (weight ratio 1:1) except as otherwise indicated.

The glass transition temperature is determined with the aid of differential thermoanalysis (DSC2, Perkin Elmer).

DETAILED DESCRIPTION OF THE INVENTION

Suitable block segments A are ethylene glycol based copolyester radicals with an average molecular weight of about 5,000–50,000 (according to the light scattering method in trifluoroacetic acid).

Suitable polymers for component B and for obtaining residue P include the following or mixtures thereof:

1. linear and/or branched polyolefines which are obtained from olefines with 2–5 C atoms and an average molecular weight of about 400 to $10^6$ (values up to 10,000 determined by vapour pressure osmometry, values above 10,000 and up to 200,000 determined by membrane osmometry and values above 200,000 determined by the light scattering method), such as polyisobutylenes, polyisoprenes, polybutadienes, polypropylenes and, preferably, polyethylenes with functional hydroxyl or carboxyl groups, which can be obtained by controlled thermo-oxidative degradation.

2. Polyalkylene glycols (more precisely: poly(alkylene oxide)-w,w'-diols) with an average molecular weight of about 400 to 100,000, preferably of about 2,000 to 25,000 (values up to 20,000 determined by determination of terminal OH groups; values up to 100,000 determined by membrane osmometry) and a carbon/oxygen ratio of about 2.0 to 4.5, such as polyethylene glycols, polypropylene glycols and polybutylene glycols.

Suitable codiols for component C and for obtaining residue D are preferably diols with at least one secondary or tertiary OH group, such as 2-ethylhexane-1,3-diol; 3-methylpentane-2,4-diol; 2-methylpentane-2,4-diol; 2,2,4-trimethylpentane-1,3-diol; hexane-2,5-diol; or butane-1,3-diol; but diols with two primary OH groups, such as, for example, 2,2-diethylpropanediol, butane-1,4-diol and propane-1,3-diol, are also suitable. The positive action of the radicals of the codiols listed on the rate of crystallization of the block copolyesters according to the invention decreases in the indicated sequence.

The polycondensates according to the invention crystallize considerably more rapidly than pure polyethylene terephthalate and possess a very high melting point, that is to say they possess a combination of properties which is highly desirable and has not been achieved by the terephthalic acid esters known hitherto.

They can be molded at mold temperatures between about 120° and 80° C., preferably at about 90° C., and, under these conditions, permit a substantially shorter cycle time than conventional polyethylene terephthalates containing nucleating agents. The rate of crystallization can be even further increased by the addition of nucleating agents.

In addition, compared with a conventional mixture of polyethylene terephthalate and a second polymer (DT-OS (German Published Specification) Nos. 2,109,560, 2,255,654, 2,310,034, 2,330,022 and 2,364,318), the block copolyesters of the invention have the decisive advantage that, because of their higher rate of crystallization and their greater crystallinity, they are significantly more stable towards oxidative and hydrolytic influences. However, this also means that polymers which are unstable towards thermooxidation, such as polyalkylene glycols, especially polypropylene glycols and polyethylene glycols, can be used as block segments B without the decomposition which occurs during processing by injection molding at a material temperature of 260° C. being greater than that in the case of pure polyethylene terephthalate. A copolymer which consists of pure polyethylene terephthalate and a polyalkylene glycol (British Patent Specification 682,866 and U.S. Pat. No. 2,744,087) can also not be processed without decomposition under the above conditions. A drastic reduction in the molecular weight takes place. The moldings obtained therefrom are fragile and brittle.

The dicarboxylic acid component of the polyalkylene terephthalate (A) consists of terephthalic acid, which can be replaced up to the extent of about 10 mol %, relative to the acid component, by other aromatic dicarboxylic acids with 6–14 C atoms, by aliphatic dicarboxylic acids with 4–8 C atoms or by cycloaliphatic dicarboxylic acids with 8–12 C atoms. Examples which may be mentioned of such dicarboxylic acids are phthalic acid, isophthalic acid, naphthalene-2,6-dicarboxylic acid, diphenyl-4,4'-dicarboxylic acid, adipic acid, sebacic acid and cyclohexanediacetic acid.

The polyethylene terephthalates (A) can, of course, be branched by trihydric or tetrahydric alcohols or tribasic or tetrabasic acids, as is described, for example, in DT-OS (German Published) No. 1,900,270 ( U.S. Pat. No. 3,692,744). Suitable branching agents are, for example, trimesic acid, pyromellitic acid, trimethylolpropane and trimethylolethane and pentaerythritol. It is advisable to employ not more than about 1 mol %, relative to the acid component, of branching agent.

All the known catalysts can be employed for the esterification reaction and for the polycondensation reaction, for example: monomeric and/or polymeric tetraalkyl titanates containing alkyl radicals with 1 to 10 C atoms, for example tetrabutyl titanate and tetraisopropyl titanate, acetates of monovalent and divalent metals such as zinc, manganese, calcium, cobalt, lead, cadmium, sodium and lithium, compounds of trivalent antimony, such as antimony trioxide, antimony triacetate and antimony trichloride, compounds which are derived from antimony and glycols, compounds of trivalent boron, such as boric acid, boric anhydride and borates, compounds which are derived from boron and glycols, compounds of tetravalent germanium, such as amorphous germanium dioxide and germanium tetrachloride, and compounds which are derived from germanium and glycols, or mixtures of the catalysts mentioned.

Preferred catalysts for the preparation of the copolyesters of the invention are the acetates of zinc, manganese, cadmium and calcium, germanium compounds, such as germanium dioxide, especially as a solution in glycol, boron compounds, such as boric anhydride or borates, antimony compounds, such as antimony trioxide, especially as a solution in glycol, and titanium compounds, such as tetraalkyl titanates, for example tetraisopropyl titanate, or combinations of the compounds mentioned.

In order to provide protection against degradation by oxidation by means of heat, customary amounts, preferably about 0.001 to 0.5% by weight, relative to the copolyesters, of known stabilizers can be added to the copolyesters of the invention. Suitable stabilizers are phenols and phenol derivatives, preferably sterically hindered phenols, amines, preferably secondary arylamines and their derivatives, quinones, phosphites and phosphates, preferably aryl derivatives, copper salts of organic acids and addition compounds of Cu-I halides with phosphites.

The process according to the invention can be carried out discontinuously in appropriate reaction equipment and mixing equipment. The continuous procedure on screw machines is a particularly preferred form, the homo(polyethylene terephthalate), block segment polymer and codiol being metered in together or the block segment polymer and codiol being added to the homo(polyethylene terephthalate) melt. Compared with the block copolyesters prepared in the manner described in German Published Pat. (Offenlegungsschrift) No. 25 45 720, the block copolyesters prepared in this way have the additional advantage that they crystallize even more rapidly. As a rule, the start of crystallization is about 10°-20° C. above the start of crystallization of comparable block copolyesters and 40° to about 60° C. above that of polyethylene terephthalate.

The high crystallinity of the block copolyester, which ensures hardness, dimensional stability and stability of shape even at elevated temperatures, is achieved more rapidly, and the mold dwell time in the injection cycle is therefore considerably shortened.

In order to achieve a high molecular weight, the copolyesters of the invention are subjected to a solid material after-condensation. In this procedure, the granular product may be subjected to an after-condensation reaction in a rotary apparatus in vacuo under a pressure of less than 1 mm Hg or in a stream of nitrogen and at a temperature which is about 60°-5° C. below the melting point of the polymer.

The copolyesters of the invention can, of course, be reinforced with reinforcing materials. Metals, silicates, carbon and glass, mainly in the form of fibers, fabrics or mats, have proved suitable reinforcing materials. Glass fibers are the preferred reinforcing material.

In addition, inorganic or organic pigments, dyestuffs, lubricants and release agents, such as zinc stearate, UV absorbers and the like, can, of course, be added in the customary amounts if desired.

In order to obtain flame-resistant products, about 2 to 20% by weight, relative to the molding composition, of flame-proofing agents which are in themselves known, such as, for example, halogen-containing compounds, elementary phosphorus or phosphorus compounds, phosphorus-nitrogen compounds, antimony trioxide, or mixtures of these substances, preferably antimony trioxide, decabromodiphenyl ether and tetrabromobisphenol A polycarbonate, are added.

The rate of crystallization of the copolyesters produced according to the invention can be further increased by the addition of about 0.01 to 1% by weight, relative to the copolyesters which have not been filled and are not reinforced, of nucleating agents. Suitable nucleating agents are compounds known to those skilled in the art, such as are described, for example, in Kunststoff-Handbuch (Plastics Handbook), Volume VIII, "Polyester" ("Polyesters"), Carl Hanser Verlag, Munich 1973, page 701.

The copolyesters prepared according to the invention are excellent starting materials for the preparation of films and fibers and preferably for the preparation of moldings of all types by injection molding.

They enable the mold temperatures to be lowered to below 100° C., while maintaining the good crystallization characteristics, and thus water-heated molds can be used.

EXAMPLES

The samples were characterized by their intrinsic viscosity and the thermodynamic data important for the melting and crystallization characteristics, such as the fusion enthalpy ($\Delta H_m$), melting point ($T_m$) and crystallization point ($T_c$).

The sooner the polymer crystallizes out, at a constant rate of cooling and under otherwise identical experimental conditions, the higher is the rate of crystallization; that is to say the supercooling $\Delta T = T_m - T_c$ indicates when the rate of crystallization achieves its maximum under the cooling conditions used.

In the examples which follow, the parts given are parts by weight:

EXAMPLES 1–4

90 parts of polyethylene terephthalate granules with a manganese-II acetate content of 0.04% by weight, a germanium dioxide content of 0.01% by weight and an intrinsic viscosity of 0.672 dl/g (measured in a phenol/tetrachloroethane mixture in the weight ratio 1:1 at 25° C.) are intimately mixed in a mixer together with 10 parts of a block segment polymer and 0.5 part of 2-ethylhexane-1,3-diol and the mixture is then melted in a twin-screw extruder and homogenized in the melt at 260° C. The polyester melt is spun off through a water bath and granulated and the granules are subjected to a polycondensation reaction in a tumbler drier at 225° C. in a stream of nitrogen.

COMPARISON EXAMPLES 5-8

5,826 g (30 mols) of dimethyl terephthalate and 4,104 g (66 mols) of ethylene glycol are heated, in the presence of 4.62 g of calcium acetate, at 200° C. in a 25 l autoclave for 2 hours, while stirring and passing nitrogen over the mixture, whereupon methanol distils off. After the transesterification has ended, 36 ml of GeO$_2$ solution (5% strength by weight in ethylene glycol), 6 g of tris-nonylphenyl phosphite, 26.3 g (0.18 mol) of 2-ethylhexane-1,3-diol and 600 g (10% by weight) of a block segment polymer are added. The temperature is raised to 210° C. and kept at this value for 2 hours. Thereafter, the temperature is increased to 250° C. in the course of a further hour and at the same time the apparatus is evacuated (<1.0 mm Hg). Finally, the mixture is stirred for a further 2 hours at 250° C. and under a pressure of less than 0.5 mm Hg. The polyester melt is then spun off through a water bath and granulated.

Examples 1-4 (Table 1) describe the block copolyesters prepared by the process according to the invention. The value of the supercooling for these products is about 10° C. lower than for the block copolyesters prepared according to German Published Pat. (Offenlegungsschrift) No. 25 45 720, that is to say the block copolyesters prepared by the process according to the invention crystallize considerably more rapidly than the polyesters obtained according to the conventional polycondensation method (as used for instance in comparative Examples 5-8). Examples 9 and 10 give the corresponding data for pure polybutylene terephthalate and polyethylene terephthalate.

Table 1

| Example | Block segment polymer | η [dl/g] | ΔH$_m$ [cal/g] | T$_m$ [°C.] | T$_c$ [°C.] | T$_m$ − T$_c$ [°C.] |
|---|---|---|---|---|---|---|
| | Polyethylene glycol/terephthalate block copolyesters containing 0.6 mol % of 2-ethylhexane-1,3-diol as the codiol and 10% by weight of polyethylene glycol or polyethylene as the block polymer | | | | | |
| 1 | Polyethylene glycol (M$_n$ = 4,000) | 0.78 | 9.0 | 244 | 200 | 44 |
| 2 | Polyethylene glycol (M$_n$ = 6,000) | 0.86 | 9.2 | 248 | 205 | 43 |
| 3 | Polyethylene glycol (M$_n$ = 20,000) | 0.85 | 9.6 | 254 | 214 | 40 |
| 4 | Polyethylene (M$_w$ = 96,000), containing carboxyl groups, 1.3% by weight of COOH | 0.83 | 8.5 | 251 | 192 | 59 |
| 5 | Polyethylene glycol (M$_n$ = 4,000) | 0.76 | 8.8 | 241 | 183 | 58 |
| 6 | Polyethylene glycol (M$_n$ = 6,000) | 0.87 | 8.9 | 242.5 | 185.5 | 57 |
| 7 | Polyethylene glycol (M$_n$ = 20,000) | 0.81 | 9.6 | 256.5 | 205.5 | 51 |
| 8 | Polyethylene (M$_w$ = 96,000), containing carboxyl groups, 1.3% by weight of COOH | 0.84 | 8.2 | 250 | 184 | 66 |
| 9 | Homo-polybutylene terephthalate | 0.87 | 9.2 | 226 | 173 | 53 |
| 10 | Homo-polyethylene terephthalate | 0.72 | 7.8 | 255 | 152 | 103 |

The symbols used in the Table have the following meanings:

η: intrinsic viscosity in phenol/tetrachloroethane 1:1, measured in a Ubbelohde capillary viscometer, polymer concentration: 0.5 g/dl, temperature 25° C.

ΔH$_m$: fusion enthalpy

T$_m$: melting point

T$_c$: crystallization point, measured with a DSC 2 (Perkin Elmer) using a sample weight of about 10 mg and a heating and cooling rate of 20° C./minute.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A rapidly crystallizing thermoplastic block copolyester which has an intrinsic viscosity of at least 0.4 dl/g (in 1:1 phenol/tetrachloroethane at 25° C.) and which consists essentially of the following structural units:

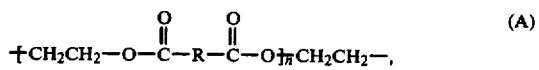

(A)

(B)

(C)

in each case said structural units are bound into the copolyester chain via

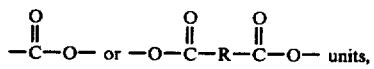

units, wherein

R is the carboxyl free residue of an aromatic, cycloaliphatic or aliphatic dicarboxylic acid and at least 90 mol % of R is the residue of terephthalic acid, n is a polymerization degree sufficiently high to give the defined ethylene glycol based polyester segment an intrinsic viscosity of at least about 0.2 dl/g (in 1:1 phenol/tetrachloroethane at 25° C. and 0.5% strength), P is the reactive end group free residue of a polymer having:

a glass transition temperature below about 0° C., reactive carboxyl, ester or hydroxyl end groups, and a molecular weight of about 400 to 1,000,000, and D is the hydroxyl residue of a codiol having: 4 to 10 carbon atoms, its hydroxyl groups separated by a 3 or 4 carbon atom branched or unbranched aliphatic residue, and either at least one secondary or tertiary hydroxyl group, or two primary hydroxyl groups on an unsubstituted, monoalkyl substituted or dialkyl substituted residue wherein the substituents, if any, have a total of at least 4 carbon atoms, said copolyester containing about 60 to 95 wt. % of structural units (A) and about 40 to 5 wt. % of structural units (B) based on the total weight of units (A) and (B) and about 10 to 0.5 mol % of structural units (C) based on the total mols of ethylene glycol residues in structural units (A).

2. The block copolyester of claim 1 wherein structural units (A) are derived from ethyleneglycol based polyesters having molecular weights of between about 5,000 and 50,000.

3. The block copolyester of claim 1 wherein structural units (B) are the residues of either
   (i) linear or branched polyolefins obtained from 2 to 5 carbon atom olefines, or
   (ii) poly(alkylene oxide)-w,w'-diols) with molecular weights between about 400 and 100,000 and carbon to oxygen ratios of about 2.0 to 4.5.

4. The block copolyester of claim 3 wherein structural units (B) are the residues of either
   (i) polyethylene, or
   (ii) poly(ethylene oxide)-w,w'-diols with molecular weights between about 2,000 and 25,000, and the structural units (c) are residues of diols having at least one secondary or tertiary hydroxyl group.

5. The block copolyester of claim 3 wherein structural units (C) are the residues of diols selected from the groups consisting of 3-methyl pentane-2,4-diol; 2-methyl pentane-2,4-diol; 2,2,4 trimethyl pentane-1,3-diol; hexane-2,5-diol; and butane-1,3-diol.

6. The block copolyester of claim 3 wherein structural units R consist entirely of the residues of terephthalic acid.

7. The block copolyester of claim 3 wherein up to about 10 mol % of structural units R consist of the residues of dicarboxylic acids selected from the group consisting of $C_{6-14}$ aromatic, $C_{4-8}$ aliphatic and $C_{8-12}$ cycloaliphatic.

8. A process for the production of rapidly crystallizing thermoplastic block copolymers having intrinsic viscosities of at least about 0.4 dl/g (in 1:1 phenol/tetrachloroethane at 25° C.) comprising
   (1) mixing
      (A) about 60 to 95 wt. %, based on the weight of (A) and (B) of a homopolyethylene terephthalate with an intrinsic viscosity of at least about 0.2 dl/g (in 1:1 phenol/tetrachloroethane at 25° C.), with
      (B) about 40 to 5 wt. %, based on the weight of (A) and (B) of a polymer with reactive carboxyl, ester or hydroxyl end groups and a glass transition temperature of below about 0° C., and
      (C) about 10 to 0.5 mol %, based on the mols of ethylene glycol residues in (A), of a codiol having 4 to 10 carbon atoms, the OH groups of which are separated by aliphatic branched or unbranched groups of 3 or 4 carbon atoms, said diol having either
         (i) at least one secondary or tertiary OH group or
         (ii) two primary OH groups, in which case the diol is unsubstituted, monoalkyl substituted or dialkyl substituted, and the substituents, if any, have a total of at least 4 carbon atoms,
   2. homogenizing the mixture in the form of a melt,
   3. solidifying the homogenized melt, and
   4. subjecting the solid so obtained to a polycondensation in vacuum or under streaming nitrogen at a temperature about 60° to 5° C. below the melting point of said homogenized mixture.

9. The process of claim 8 wherein said melt homogenization is conducted in the presence of esterification or transesterification catalysts.

10. The process of claim 9 wherein said melt homogenization is conducted at between about 150° and 250° C.

11. The process of claim 9 wherein the polycondensation is conducted at between about 200° and 300° C. in the presence of esterification catalysts.

12. The process of claim 9 wherein the catalysts are selected from the group consisting of acetates of zinc, manganese, cadmium and calcium, germanium compounds, boron compounds, antimony compounds and titanium compounds.

13. The process of claim 8 wherein the melt homogenization is conducted in a screw machine, the mixture is granulated and the granules are subject to polycondensation under a vacuum of less than 1 mm mercury or streaming nitrogen.

14. The product of the process of claim 8.

15. The block copolyester of claim 1 containing about 0.001 to 0.5 wt. % of a stabilizer comprising a phenol or phenol derivative.

16. A molding composition comprising the block copolyester of claim 15, reinforcing material, an effective amount of U. V. stabilizer, colorants selected from organic and inorganic pigments and dyestuffs, an effective amount of mold release agent, lubricant and about 2 to 20 wt. % of flame proofing agent.

17. A film, fiber or molding made from the block copolyester of claim 1.

18. A molding composition comprising the block copolyester of claim 1 and about 0.01 to 1 wt. % of nucleating agents.

19. The block copolyester of claim 1 containing up to about 1 mol %, based on the mols of R, of branching agent.

* * * * *